US007003762B2

(12) United States Patent
Krueger

(10) Patent No.: US 7,003,762 B2
(45) Date of Patent: *Feb. 21, 2006

(54) COMPUTER-IMPLEMENTED EXCEPTION HANDLING SYSTEM AND METHOD

(75) Inventor: Steven E. Krueger, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 494 days.

This patent is subject to a terminal disclaimer.

(21) Appl. No.: 10/210,438

(22) Filed: Aug. 1, 2002

(65) Prior Publication Data

US 2004/0025084 A1   Feb. 5, 2004

(51) Int. Cl.
*G06F 9/44*   (2006.01)
(52) U.S. Cl. ............. 717/126; 717/127; 717/128; 717/129; 717/139; 717/140; 714/34; 714/35; 712/233; 712/234; 712/239
(58) Field of Classification Search .......... 717/124, 717/126, 127–131, 139–140, 155, 159, 136, 717/141; 712/200, 235, 244, 227–228, 233–234, 712/239; 719/331; 714/34, 35, 38
See application file for complete search history.

(56) References Cited

U.S. PATENT DOCUMENTS

| | | | | |
|---|---|---|---|---|
| 4,342,082 A | * | 7/1982 | Brown et al. ............ 710/264 |
| 5,170,465 A | * | 12/1992 | McKeeman et al. ........ 717/145 |
| 5,432,795 A | * | 7/1995 | Robinson .................. 717/125 |
| 5,455,949 A | * | 10/1995 | Conder et al. .............. 712/234 |
| 5,487,132 A | * | 1/1996 | Cheng ...................... 706/45 |
| 5,627,981 A | * | 5/1997 | Adler et al. ............... 712/235 |
| 5,724,564 A | * | 3/1998 | Conder et al. .............. 712/234 |
| 5,761,407 A | * | 6/1998 | Benson et al. .............. 714/37 |
| 5,761,467 A | * | 6/1998 | Ando ....................... 712/200 |
| 5,761,513 A | * | 6/1998 | Yellin et al. ............... 717/127 |
| 5,832,202 A | * | 11/1998 | Slavenburg et al. ......... 714/16 |
| 5,881,280 A | * | 3/1999 | Gupta et al. ............... 712/244 |
| 6,067,577 A | * | 5/2000 | Beard ....................... 719/331 |
| 6,247,117 B1 | * | 6/2001 | Juffa ........................ 712/222 |
| 6,247,169 B1 | * | 6/2001 | DeLong ..................... 717/131 |
| 6,260,190 B1 | * | 7/2001 | Ju ........................... 717/156 |
| 6,353,818 B1 | * | 3/2002 | Carino, Jr. ................. 707/2 |
| 6,353,820 B1 | * | 3/2002 | Edwards et al. ............. 707/2 |
| 6,412,109 B1 | * | 6/2002 | Ghosh ....................... 717/155 |
| 6,487,716 B1 | * | 11/2002 | Choi et al. ................. 717/159 |
| 6,625,797 B1 | * | 9/2003 | Edwards et al. ............. 716/18 |
| 6,634,023 B1 | * | 10/2003 | Komatsu et al. ............ 717/159 |
| 6,772,413 B1 | * | 8/2004 | Kuznetsov .................. 717/136 |
| 6,848,111 B1 | * | 1/2005 | Schwabe et al. ............ 719/331 |
| 6,918,030 B1 | * | 7/2005 | Johnson ..................... 712/225 |

OTHER PUBLICATIONS

TITLE: Speculative Execution Exception Recovery using Write-back Suppression, author: Bringmann et al, IEEE, 1992.*
TITLE: The mach Exception Handling Facility, author: Black et al, ACM, 1988.*
TITLE: A Recovery Mechansim for Modular Software, author: Cristian, IEEE, 1979.*

* cited by examiner

*Primary Examiner*—Chameli C. Das
(74) *Attorney, Agent, or Firm*—Jones Day

(57) ABSTRACT

A computer-implemented system and method for handling run-time exceptions. Source code is provided as input to a compiler. The source code includes an exception branching statement and an exception catching statement. The compiler generates machine code from the source code. During execution of the machine code, an exception occurs and execution branches to the exception catching statement in accordance with the exception branching statement.

20 Claims, 4 Drawing Sheets

COMPUTER-IMPLEMENTED EXCEPTION HANDLING SYSTEM AND METHOD

CROSS-REFERENCE TO RELATED APPLICATIONS

This application is related to U.S. patent application entitled "Computer-Implemented System And Method For Code Generation," filed on Aug. 1, 2002, and having Ser. No. 10/210,831.

TECHNICAL FIELD

The present invention relates generally to computer program execution flow and more particularly to computer program exception handling.

BACKGROUND

Run-time exception handling techniques currently utilize context saving operations to recover from exceptions. However, context saving operations may be performed multiple times during runtime to save the ever changing context of an executing program. The repeated context saving operations diminish the performance of an executing program. Other exception handling techniques similarly hinder performance.

SUMMARY

In accordance with the teachings disclosed herein, a computer-implemented system and method are provided for handling run-time exceptions. Source code is received by a compiler as input. The source code includes an exception branching statement and an exception catching statement. The compiler produces machine code from the source code. During execution of the machine code, an exception occurs and execution branches to the exception catching statement in accordance with the exception branching statement.

DETAILED DESCRIPTION

Figure 1:
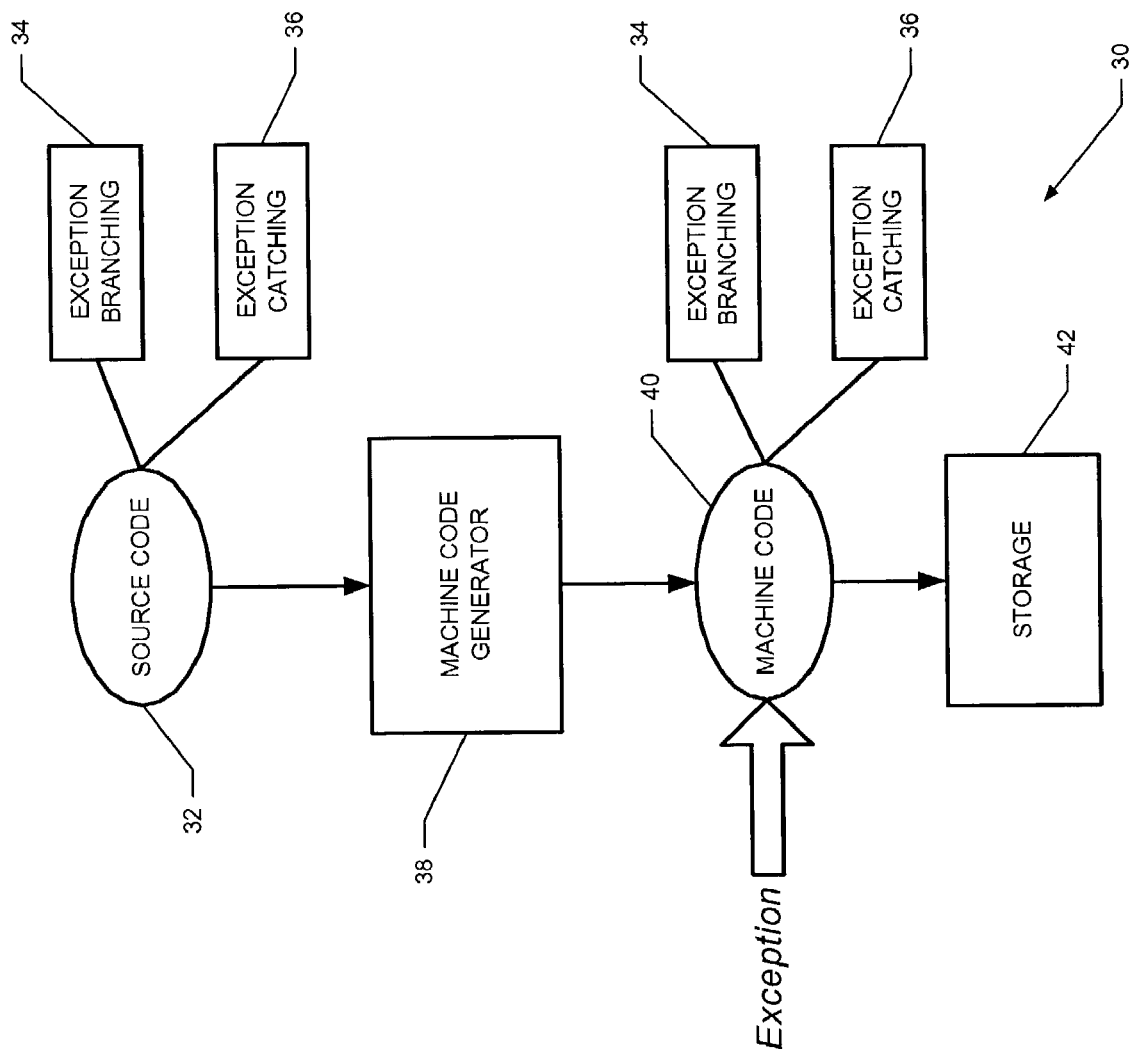
FIG. 1 is a block diagram depicting an exception handling system.

FIG. 1 shows a computer-implemented exception handling system at 30. The system 30 allows source code 32 that contains branching and catching type exception handling operations (34, 36) to be compiled and to recover from exceptions encountered during execution. A machine code generator 38 first compiles the source code 32 along with its exception handling operations (34, 36) into machine code 40 and places it in storage 42 (e.g., a computer's hard drive or a computer server) for later execution.

The run-time exception handling operations (34, 36) include an exception branching operation 34 that records the location of recovery code contained within the exception catching operation 36. The run-time exception handling operations (34, 36) allow for the reduction or the elimination of having to continually save the context of an executing program when trapping for exceptions.

The exception handling techniques may be used with source code of many different types of higher order languages, such as C, FORTRAN, Pascal, assembly, etc. For such languages, source code may be written by a user through such editor programs as Visual C, Microsoft Fortran, Turbo Pascal, etc. The source code is stored as a file on a non-volatile storage device, such as a computer's hard drive or a server.

Figure 2:
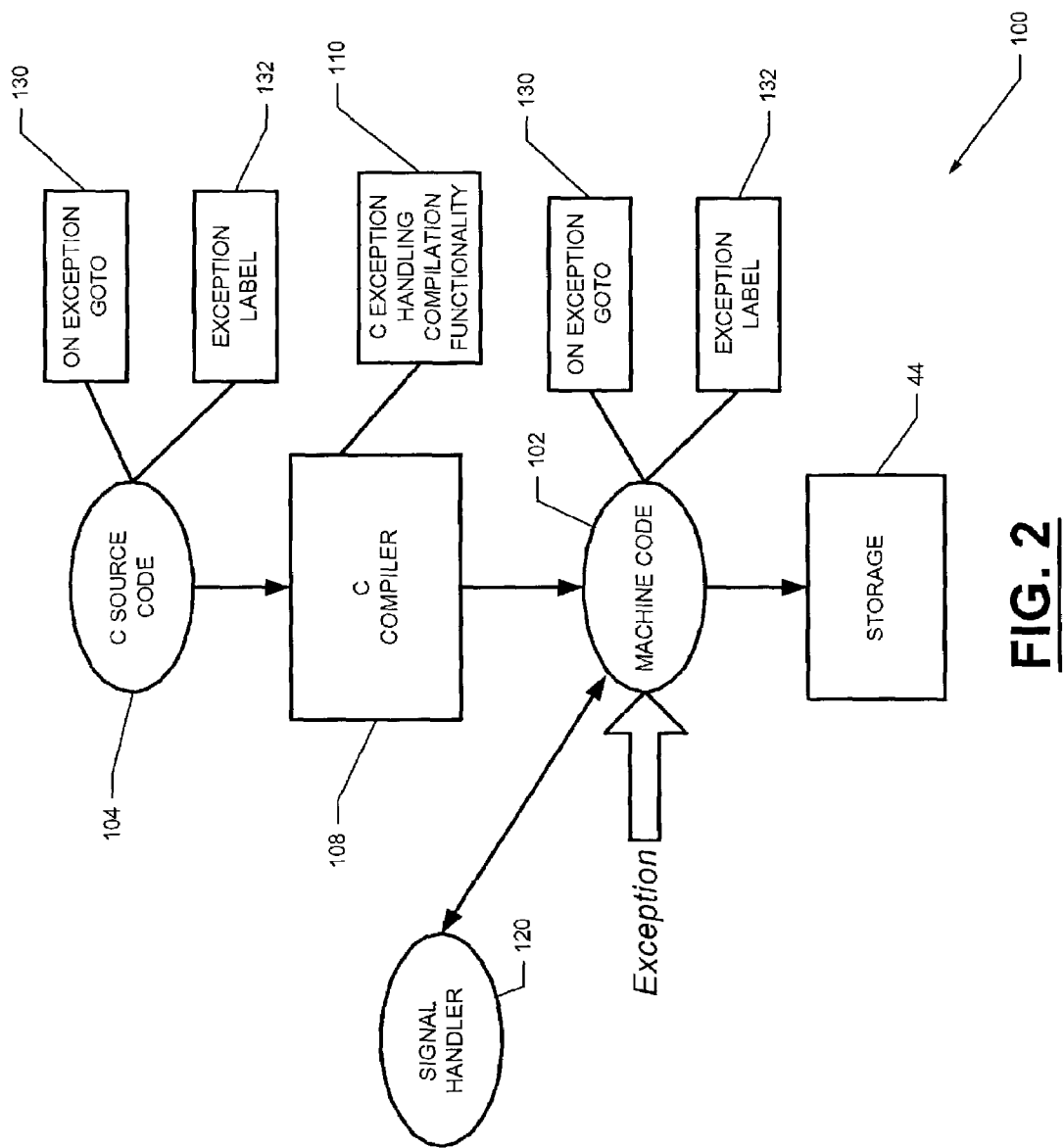
FIG. 2 is a block diagram depicting exception handling techniques involving a C code compiling system.

FIG. 2 shows an example where an exception handling generation extension 110 allows a C compiler 108 to compile C source code 104 that contains the exception handling operations (130, 132). The C compiler 108 includes compiling functionality 110 which can generate machine code 102 such that execution resumes at the EXCEPTION_LABEL( ) statement 132 no matter where in the machine code 102 the exception happens. Within the C source code 104, the exception handling operations (130, 132) may resemble the following:

ON_EXCEPTION_GOTO(label);

. . .

[code goes here that could possible cause an exception]

. . .

EXCEPTION_LABEL(label)

. . .

[recovery code to continue after an exception goes here]

. . .

The ON_EXCEPTION_GOTO( ) statement 130 is a relatively fast operation that records the location of the recovery code located at the exception label 132. When an exception happens, an exception signal handler 120 is used to allow execution to resume at the recovery code contained at the exception label 132. The exception signal handler 120 accomplishes this by placing the value stored from the exception branching functionality 130 into the PC (program counter) slot of the exception context structure that was passed to the exception signal handler 120. The exception signal handler 120 then returns, and execution continues at the exception label 132.

The ON_EXCEPTION_GOTO( ) statement 130 may be placed at any point within the source code 104. For example, the ON_EXCEPTION_GOTO( ) statement 130 may be placed in the beginning of the source code 104 in order to have exception handling techniques available from the execution's start. The exception-related statements (130 and 132) may be placed at other locations within the source code as well as contain different recovery code in order to effect different exception handling strategies. For example, the program may in a first set of exception-related statements attempt to handle a potential floating point overflow exception in the section of the code dealing with the multiplication of two very large numbers. The recovery code for this first set of exception-related statement could choose to set the result to the largest possible floating point number, and continue execution. Within the same program, a second set of exception-related statements may be used to handle null pointer exceptions. Such operations are useful for a wide range of software computer programs, such as data mining applications, database applications, and statistical applications.

The exception handling functionality may also handle many types of exceptions, such as for example I/O interrupts (e.g., a person hitting control C while the program is executing), null pointer exceptions, overflow errors, or index outside the bounds of an array, etc. Other exception handling may include the recovery code allowing locks to be properly released if the program is involved in a concurrency situation.

It is noted that the recovery code can perform any actions necessary or useful for handling the exception at hand. For example, the recovery code may allow the executing program to recover from the exception, activate a debugging program to analyze the exception, or terminate the program gracefully. Also, the machine code may be any type of executable code, such as a .EXE file, a dynamic-link library (DLL) file, a self-contained executable program, a program that calls other programs (whether through inter-process, intra-process, and/or network communication mechanisms).

Figure 3:
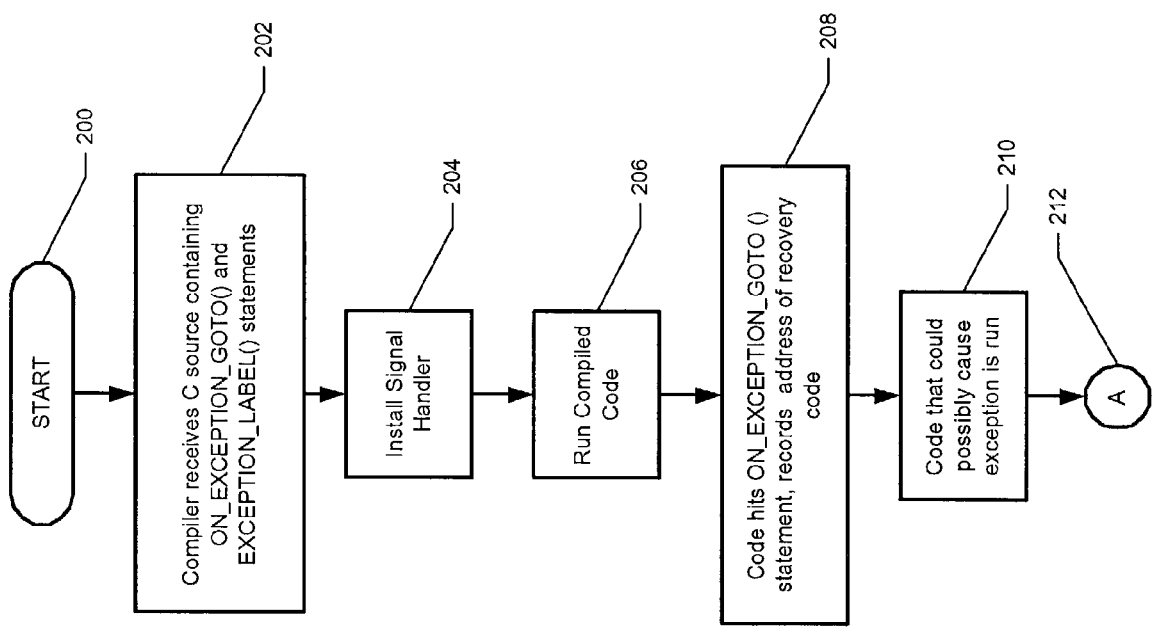
FIGS. 3 and 4 are flowcharts depicting exemplary operational steps for exception handling techniques.
Figure 4:
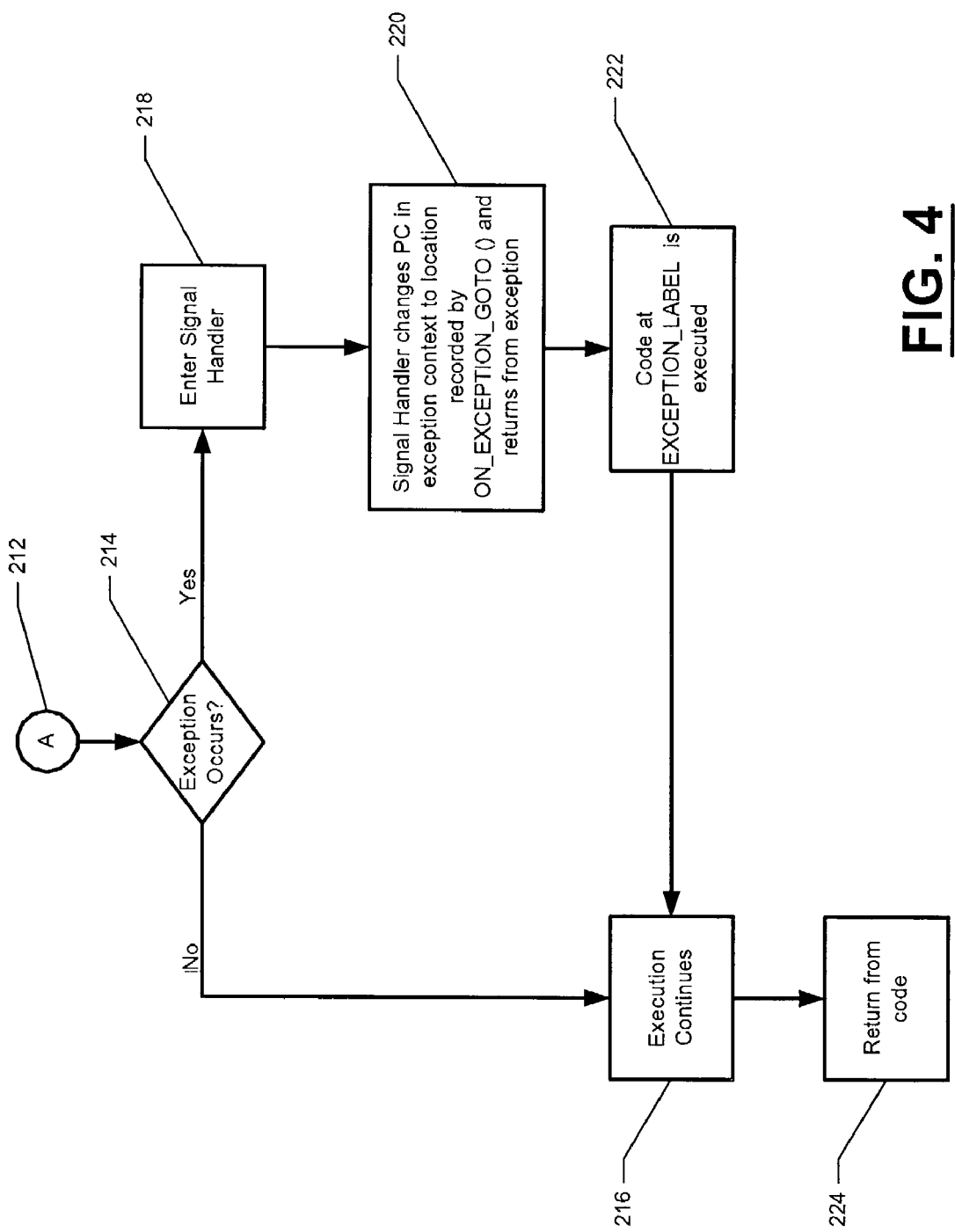

FIGS. 3 and 4 depict exemplary operational steps for exception handling techniques involving the C exception handling system of FIG. 2. With reference to FIG. 3, start block 200 indicates that process block 202 executes. At process block 202, C source code that contains an ON_EXCEPTION_GOTO( ) and EXCEPTION_LABEL( ) statements is compiled, and process block 204 installs the signal handler.

At process block 206, the machine code is executed. At process block 208, the machine code hits the ON_EXCEPTION_GOTO( ) statement which causes the address of the recovery code to be recorded. Within the machine code, the code portion that could possibly cause an exception is executed at process block 210. Processing continues on FIG. 4 as indicated by continuation block 212.

With reference to FIG. 4, decision block 214 examines whether an exception has occurred during execution. If no exception occurred, then execution continues at process block 216 before processing returns from the machine code at process block 224.

However if an exception had occurred as determined by decision block 214, then the signal handler is invoked at process block 218. At process block 220, the signal handler changes the PC in the exception context to the location recorded by the ON_EXCEPTION_GOTO( ) and returns from the exception. At process block 222, the recovery code at the EXCEPTION_LABEL is executed, and execution continues at process block 216 before processing returns from the machine code at process block 224.

While examples have been used to disclose the invention, including the best mode, and also to enable any person skilled in the art to make and use the invention, the patentable scope of the invention is defined by the claims, and may include other examples that occur to those skilled in the art. As an example of the wide scope attributable to the system and method, the exception handling operations may be extended to allow exception handling code to be turned off as well as turned back on through compiler options or input configuration data provided during runtime.

The invention claimed is:

1. A computer-implemented method for handling run-time exceptions, comprising the steps of:
   (a) receiving source code that includes higher order computer language statements, wherein the statements include an exception branching statement and an exception catching statement;
   (b) compiling the received source code into machine code and storing the machine code in a non-volatile storage medium;
   (c) executing the machine code,
   wherein upon an exception occurring, execution of the executing machine code branches to the exception catching statement in accordance with the exception branching statement;
   wherein upon an exception happening, an exception signal handler allows execution to resume at recovery code associated with the exception catching statement;
   wherein the exception signal handler comprises software instructions;
   wherein the exception signal handler allows execution to resume at the recovery code by placing a value stored from the exception branching statement into a program counter slot of an exception context structure that was passed to the exception signal handler.

2. The method of claim 1 wherein the exception branching statement includes $ON_{13}$ $EXCEPTION_{13}$ GOTO statement means.

3. The method of claim 2 wherein the $ON_{13}$ $EXCEPTION_{13}$ GOTO( ) statement means records location of the recovery code.

4. The method of claim 1 wherein the exception catching statement includes $EXCEPTION_{13}$ LABEL statement means.

5. The method of claim 1 wherein the computer program comprises a data mining application.

6. The method of claim 1 wherein the computer program comprises a database application.

7. The method of claim 1 wherein the computer program comprises a statistical application.

8. The method of claim 1 wherein use of the exception branching statement reduces continually saving the context of the executing machine code when trapping for exceptions.

9. The method of claim 1 wherein use of the exception branching statement substantially eliminates continually saving the context of the executing machine code when trapping for exceptions.

10. The method of claim 1 wherein use of the exception branching statement eliminates continually saving the context of the executing machine code when trapping for exceptions.

11. The method of claim 1 wherein machine code is computer machine readable code.

12. The method of claim 11 wherein the machine code comprises physical memory addresses.

13. A compiler stored on a computer readable media, the compiler comprising program code for carrying out steps (a) and (b) of the method according to claim 1.

14. Computer software stored on a computer readable media, the computer software comprising program code for carrying out step (c) of the method according to claim 1.

15. The method of claim 1 wherein the source code comprises a first set of branching and catching statements and a second set of branching and catching statements,
   wherein the first set is directed to handling a first type of exception and the second set is directed to handling a second type of exception.

16. The computer implemented method of claim 1, wherein the execution of the machine code is non-speculative.

17. The computer implemented method of claim 1, wherein exceptions are handled without in-line re-execution of speculative code.

18. A computer-implemented system for handling run-time exceptions, comprising:
   means for compiling source code into machine code and storing the machine code in a non-volatile storage medium, wherein the source code includes higher order computer language statements, wherein the statements include an exception branching statement and an exception catching statement; and means for branching to the exception catching statement in accordance with the exception branching statement upon an exception occurring during execution of the machine code;

wherein upon an exception happening, an exception signal handler allows execution to resume at recovery code associated with the exception catching statement;

wherein the exception signal handler comprises software instructions;

wherein the exception signal handler allows execution to resume at the recovery code by placing a value stored from the exception branching statement into a program counter slot of an exception context structure that was passed to the exception signal handler.

19. A computer-implemented apparatus for handling runtime exceptions of machine code, wherein the machine code was compiled from source code and stored on a non-volatile storage device, wherein the source code includes higher order computer language statements, wherein the statements include an exception branching statement and an exception catching statement, said apparatus comprising:

an exception signal handling means for allowing execution to resume at recovery code associated with the exception catching statement, means for branching to the exception catching statement in accordance with the exception branching statement upon an exception occurring during execution of the machine code;

wherein upon an exception happening, the exception signal handling means allows execution to resume at recovery code associated with the exception catching statement;

wherein the exception signal handling means comprises software instructions;

wherein the exception signal handling means allows execution to resume at the recovery code by placing a value stored from the exception branching statement into a program counter slot of an exception context structure that was passed to the exception signal handler;

wherein the execution of the machine code is non-speculative, and exceptions are handled without in-line re-execution of speculative code.

20. A computer-implemented apparatus for handling runtime exceptions, comprising a compiler that compiles source code into machine code and stores the machine code in a non-volatile storage medium, wherein the source code includes higher order computer language statements, wherein the statements include an exception branching statement and an exception catching statement, wherein the machine code that is generated by the compiler is to include an exception signal handler that allows execution to resume at recovery code associated with the exception catching statement upon occurrence of a runtime exception, wherein reduced context information is stored allowing the execution to resume at recovery code associated with the exception catching statement.

* * * * *

UNITED STATES PATENT AND TRADEMARK OFFICE
CERTIFICATE OF CORRECTION

PATENT NO.        : 7,003,762 B2                                            Page 1 of 1
APPLICATION NO.   : 10/210438
DATED             : February 21, 2006
INVENTOR(S)       : Krueger It is certified that error appears in the above-identified patent and that said Letters Patent is hereby corrected as shown below:

Column 4,
Lines 9 and 11-12, delete "$ON_{13}EXCEPTION_{13}GOTO$" and insert
-- ON_EXCEPTION_GOTO --.
Line 15, delete "$EXCEPTION_{13}LABEL$" and insert -- EXCEPTION_LABEL --.

Signed and Sealed this

Twentieth Day of June, 2006

JON W. DUDAS
*Director of the United States Patent and Trademark Office*